United States Patent
Pugh

[19]

[11] Patent Number: 5,933,005
[45] Date of Patent: Aug. 3, 1999

[54] THROTTLE POSITION MONITOR WITH ONE STATIONARY SENSOR AND ONE MOVABLE SENSOR

[75] Inventor: Jason F. Pugh, Ripon, Wis.

[73] Assignee: Brunswick Corporation, Lake Forest, Ill.

[21] Appl. No.: 08/902,025

[22] Filed: Jul. 29, 1997

[51] Int. Cl.[6] .............................. G01B 7/14; G01B 7/30; F02P 5/00

[52] U.S. Cl. .............................. 324/207.25; 324/207.23; 123/414; 341/15

[58] Field of Search .............. 324/207.25, 207.24, 324/207.23, 207.22, 207.12, 207.11, 207.13; 123/414, 416, 417, 612, 617; 250/231.13, 231.15, 231.18; 341/15, 13, 3, 2

[56] References Cited

U.S. PATENT DOCUMENTS

| | | | |
|---|---|---|---|
| 5,140,262 | 8/1992 | Stolfus | 324/207.2 |
| 5,164,668 | 11/1992 | Alfors | 324/207.2 |
| 5,251,600 | 10/1993 | Britsch et al. | 123/414 |
| 5,304,926 | 4/1994 | Wu | 324/207.2 |

*Primary Examiner*—Walter E. Snow
*Attorney, Agent, or Firm*—William D. Lanyi

[57] ABSTRACT

An angular position sensor is provided by disposing two sensors proximate a rotatable member. A stationary sensor is located in a fixed position and a movable sensor is pivotable about the center of rotation of the rotatable member. A software routine uses a first output signal from the stationary sensor to calculate the rotational speed of the rotatable member. The software also determines a time offset between the receipt of a signal pattern by the stationary sensor and a subsequent receipt of the same pattern by the movable sensor. Using this time offset and the rotational speed of the rotatable member, the angular difference between the positions of the movable and stationary sensors can be developed. This angular difference is equivalent to the throttle position.

20 Claims, 6 Drawing Sheets

THROTTLE POSITION MONITOR WITH ONE STATIONARY SENSOR AND ONE MOVABLE SENSOR

BACKGROUND OF THE INVENTION

1. Field of the Invention

The present invention is generally related to angular position sensors and, more particularly to a throttle position sensor that uses two gear tooth sensors in combination with a rotating gear tooth pattern.

2. Description of the Prior Art

In certain applications, such as in conjunction with a throttle body or carburetor, it is necessary to determine the angular position of the throttle plate so that an electronic engine control unit can make appropriate decisions to control the operation of the engine. Whenever an engine control unit, or ECU, is used to control the operation of an internal combustion engine, it is necessary to provide some type of feedback signal so that the engine control unit is able to know the actual angular position of the throttle. Several types of angular position sensors are known to those skilled in the art. One type utilizes a wiper contact that is slidable over a resistor that is shaped either in the form of a coil or a film resistor arranged in a serpentine pattern. Rotation of the shaft attached to a throttle plate causes the wiper contact to change the resistance and, as a result, the output voltage from the angular position sensor.

A noncontact type of angular position sensor, with decreased sensitivity to shaft position variability is described in U.S. Pat. No. 5,164,668, which issued to Alfors on Nov. 17, 1992. The sensor provided with first and second pole pieces that extend from regions proximate a rotatable magnet to regions proximate a magnetically sensitive device. The pole pieces provide defined magnetic paths of lowered reluctance that confine the lines of flux extending between the rotatable magnet and the magnetically sensitive device. The placement of the rotatable magnet between first and third pole pieces of the invention significantly reduces the sensitivity of the sensor to variations in position of the rotatable magnet and therefore increases the reliability of the measurement system. This reduced sensitivity inhibits the degradation of operational accuracy that could otherwise be caused by inaccuracies in the magnet's position, large tolerances in the dimensions of the shaft diameter and the bearing diameter and, in addition, the variable location of the shaft because of excessive bearing wear.

U.S. Pat. No. 5,140,262, discloses a gear tooth sensor with a center line and non intersecting relation with the center of rotation of a rotatable member. The off axis gear tooth sensor is provided with a centerline of the sensor disposed along a line which is not coincidence with the center of rotation of the rotatable member to be sensed. Instead, the centerline of the housing in which the Hall Effect element is disposed is positioned at a perpendicular distance from the center of rotation of the rotatable member which is determined as the function of a range of dimensions which define the allowable gap between the Hall Effect element and a surface of a rotatable member. The perpendicular distance between the center of rotation and the line along which the proximity sensor is disposed is mathematically determined as a function of a distance between the center of rotation of the rotatable member and the minimum and maximum possible locations of the Hall Effect element along the angular distance between those two dimensions.

U.S. Pat. No. 5,304,926, which issued on Apr. 19, 1994, to Wu, discloses a gear tooth position sensor with two Hall Effect elements. The position sensor has two magnetically sensitive devices associated with a magnet. The sensor is disposable proximate a rotatable member having at least one discontinuity in its surface. The two magnetically sensitive devices, such as Hall Effect transducers, each provide output signals that represent the direction and magnitude of the magnetic field in which its respective transducer is disposed. An algebraic sum of the first and second output signals from the magnetically sensitive devices is provided as an indication of the location of the rotatable member that is disposed proximate the sensor.

In certain applications, such as outboard motors for marine use, the throttle position sensors experience significant vibration. As a result, the life of the throttle position sensor is decreased because of the excessive vibration. Several alternative actions can be taken to limit the disadvantages caused by the excessive vibration, but it would be significantly beneficial if a means could be developed for sensing the throttle position without requiring angular position sensors that are subject to excessive wear as a result of the vibrations normally associated with an outboard motor.

SUMMARY OF THE INVENTION

A preferred embodiment of the present invention comprises a first rotatable member having a pattern attached thereto, the rotatable member being rotatable about an axis. It further comprises a stationary sensor disposed proximate the rotatable member. The stationary sensor provides a first output that is representative of the pattern as the pattern moves past the stationary sensor in response to rotation of the rotatable member. The rotational position sensor of the present invention further comprises a second rotatable member which is rotatable within an angular range about the axis. The second rotatable member is rotatable with respect to the first rotatable member. A preferred embodiment of the present invention further comprises a movable sensor attached to the second rotatable member and disposed proximate the first rotatable member. The movable sensor provides a second output signal which is representative of the pattern as the pattern moves past the movable sensor in response to rotation of the first rotatable member. The present invention further comprises an electronic circuit for receiving the first and second signals and determining an angle between the stationary and movable sensors with respect to the axis about which the first and second rotatable members rotate.

In one particular preferred embodiment of the present invention, the pattern comprises a first plurality of teeth proximate the stationary sensor and a second plurality of teeth proximate the movable sensor. The first and second pluralities of teeth are attached to the first rotatable member. In certain embodiments of the present invention, the first and second pluralities of teeth are arranged in the pattern and are therefore identical to each other except for size. Certain embodiments of the present invention can attach the first and second pluralities of teeth to different diameters of the first rotatable member.

The electronic circuit of the present invention can be a microprocessor, but this is not required in all embodiments. The electronic circuit calculates a rotational speed of the first rotatable member as a function of the first output signal and, in addition, it calculates a time offset between the first and second output signals. The electronic circuit then calculates the angle between the stationary and movable sensors as a function of the rotational speed of the first rotatable member and the time offset between the first and second output signals. Alternatively, the angular offset can be determined by counting the teeth passing between the two sensors between unique tooth patterns.

The second rotatable member can be connected to a throttle mechanism of an internal combustion engine. The internal combustion engine can be a portion of a marine propulsion unit such as an outboard motor or a stern drive system. The stationary sensor and the movable sensor can be gear tooth sensors.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Throughout the description of the preferred embodiment, like components will be identified by like reference numerals.

Figure 1:
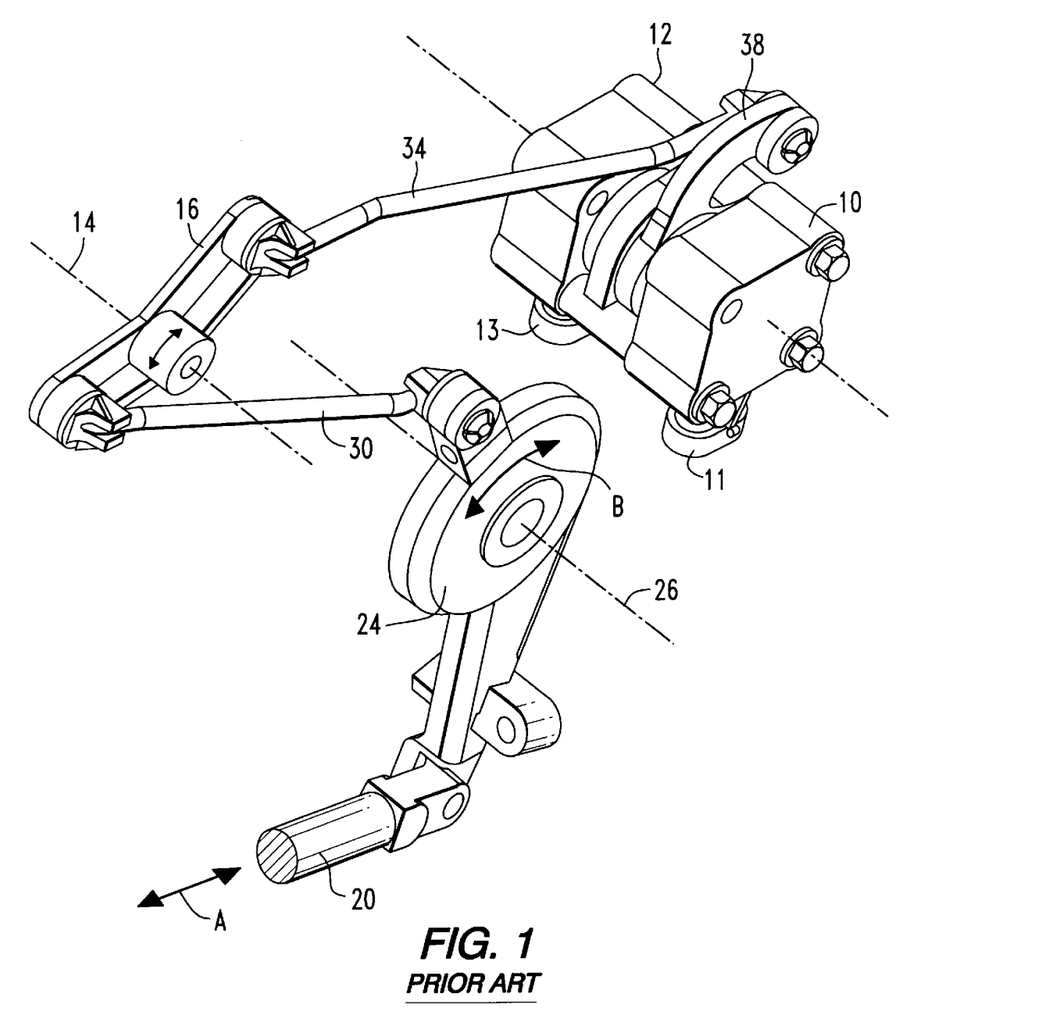
FIG. 1 shows a way in which the prior art measures the angular position of a throttle.

In marine propulsion systems, the internal combustion engine creates a severe vibration environment for the components and devices attached to it. In order to measure the angular position of a throttle plate in a throttle body structure or carburetor, some means must be provided which measures the angular position of the throttle plate and provides a signal to an engine control unit, or ECU, associated with the engine. As described above, various types of throttle position sensors have been used for these purposes. FIG. 1 shows a typical application of this technology.

In FIG. 1, two angular position sensors, 10 and 12, are used to provide a signal to an engine control unit relating to the angular position of a throttle plate. The throttle plate (not shown) rotates about center line 14 in response to movement of pivot bar 16. Under normal circumstances, when vibrations are not as severe as in marine propulsions systems, the angular position sensor would typically be placed directly in contact with the shaft that is concentric with centerline 14 and about which the throttle plate rotates. However, the throttle body of the marine engine experiences severe vibration and it is therefore beneficial if the angular position sensor is located away from the throttle body structure. As a result, the linkage system shown in FIG. 1 is required. Upon an action initiated by the operator of the engine, shaft 20 is moved in a direction along arrow A. This causes the pivotable member 24 to rotate about centerline 26 as indicated by arrow B. Linkage 30 is attached to the pivotable member 24 and therefore causes the pivotable member 16 to rotate the shaft to which the throttle plate is attached. The throttle plate therefore rotates about centerline 14 in response to the linkage system which comprises shaft 20, pivotable members 24 and 16, and linkage 30. For the reasons described above, it is desirable to mount the angular position sensor to the engine at a location which is not directly attached to the throttle body because of the severe vibrations that occur in that region. Therefore, a linkage 34 is used to connect the pivotable member 16 to another pivotable member 38. Pivotable member 38 rotates a wiper contact of an angular position sensor in one particular embodiment known to those skilled in the art. Because of the adverse effects on the life of the angular position sensors used in these applications, it is not untypical to provide two angular position sensors, 10 and 12, connected in parallel so that a throttle position signal can be provided even if one of the angular position sensors fails. The angular position sensors typically provide output signals at an electrical coupling identified by reference numeral 11 for angular position sensor 10 and by reference numeral 13 for angular position sensor 12.

As can be seen in FIG. 1, the complex linkage system used for these purposes creates additional expense because of the number of components required and the time needed to assemble the structure. In addition, the use of two angular position sensors significantly increases the cost of the system.

With continued reference to FIG. 1, it should be noted that several other disadvantages exist in the systems known to those skilled in the art. In addition to the severe problems caused by the vibrations of the engine, it is also possible for water to intrude into the housings of the angular position sensors, 10 and 12, and thereby adversely affect the operation. As a normal event, the wiper contact within the structure of the angular position sensor can be abraded to the point of malfunction. This is exacerbated by the significant vibration experienced by the angular position sensors regardless of their physical location on the engine. The use of two angular position sensors, as illustrated in FIG. 1, also provides an added expense.

Certain marine engine applications use two angular position sensors connected in parallel as illustrated in FIG. 1 because failure of the angular position sensor, where the ECU receives no viable signal therefrom, can be catastrophic. This is caused by the fact that modem engines are designed to run on very lean mixtures of fuel and air. In engines which do not run excessively lean, a runaway condition can be averted by the operator by simply moving the throttle to an "OFF" position. However, this only closes the throttle plate to restrict the flow of air into the engine. Since modem engine design has resulted in internal combustion engines that run extremely lean, this tactic by the operator of the boat will not always be effective. If this occurs, a runaway engine situation can occur.

Another problem with systems such as that illustrated in FIG. 1 is the reliability of the components. In addition to relying on a complex linkage structure, the angular position sensors in FIG. 1 can fail prematurely because of the vibration problems described above. Even if runaway situations do not occur, frequent replacement of components can be aggravating for the boat owner. It would therefore be significantly beneficial if the system shown in FIG. 1 could be replaced by a throttle position sensor that avoids the deleterious effects of vibration and reduces the number of required components. In addition, it would be particularly beneficial if the throttle position sensor could utilize certain components that are required by the engine for other purposes.

Figure 2:
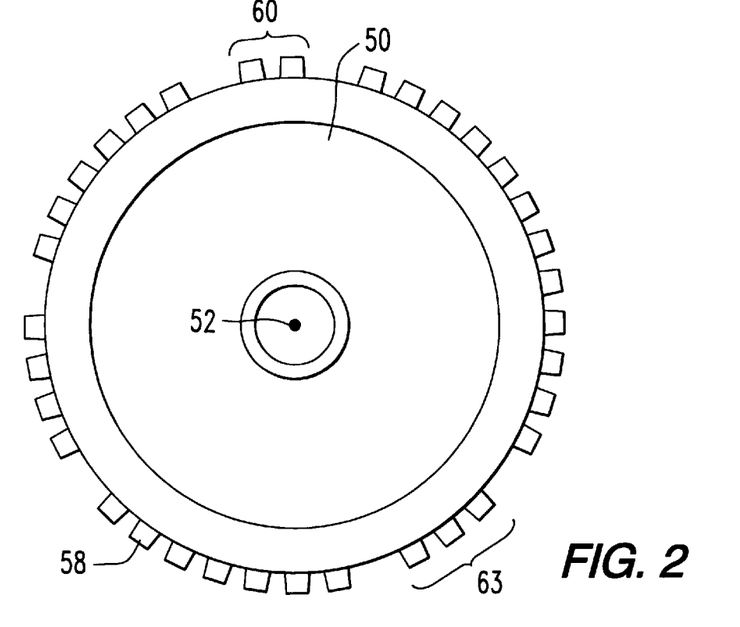
FIG. 2 shows a rotatable member with a pattern formed in its outer periphery.

FIG. 2 shows a first rotatable member 50 which is rotatable about an axis 52 shown as a point in FIG. 2 and extending perpendicular to the figure. A pattern is attached to the first rotatable member 50. In the embodiment shown in FIG. 2, this pattern is represented by a plurality of teeth 58. The teeth are arranged in a manner which defines at least one specific location on the periphery of the first rotatable member. As an example, two missing teeth are used to isolate a pair of teeth 60 between them. Two other teeth are removed to isolate three teeth 63 between the missing teeth. Several different patterns can be used for these purposes by creating tooth spacing which are easily recognizable by a gear tooth sensor. In its simplest form, this technique can remove a single tooth on the periphery of the first rotatable member 50. The missing tooth would then identify a particular location on the first rotatable member. By providing more than one identifiable feature in the pattern, other locations can be identified around the periphery of the first rotatable member.

Figure 3:
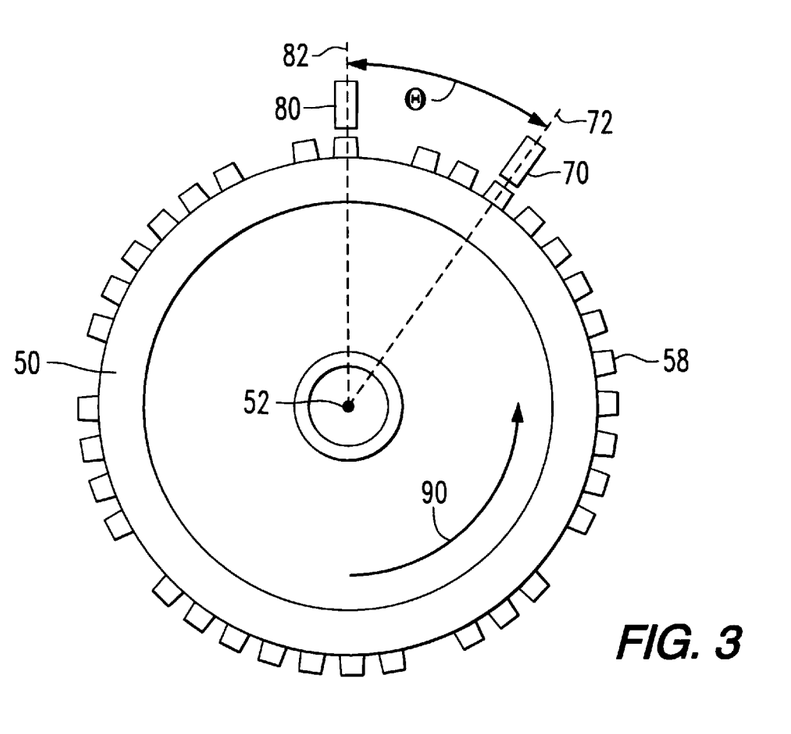
FIG. 3 shows the rotatable member of FIG. 2 associated with two sensors located at its outer periphery.

In FIG. 3, a stationary sensor 70 is disposed proximate the first rotatable member 50 in order to provide a first signal which is representative of the tooth pattern passing through its detection zone. The stationary sensor is disposed on line 72 which passes through the centerline 52. A movable sensor 80 is disposed on line 82 proximate the path along which the teeth pass in response to rotation of the first rotatable member 50 as indicated by arrow 90. The stationary sensor 70 remains at a fixed position and the movable sensor 80 is movable with respect to line 72 as line 82 rotates about axis 52 to change the magnitude of angle Θ.

Figure 4:
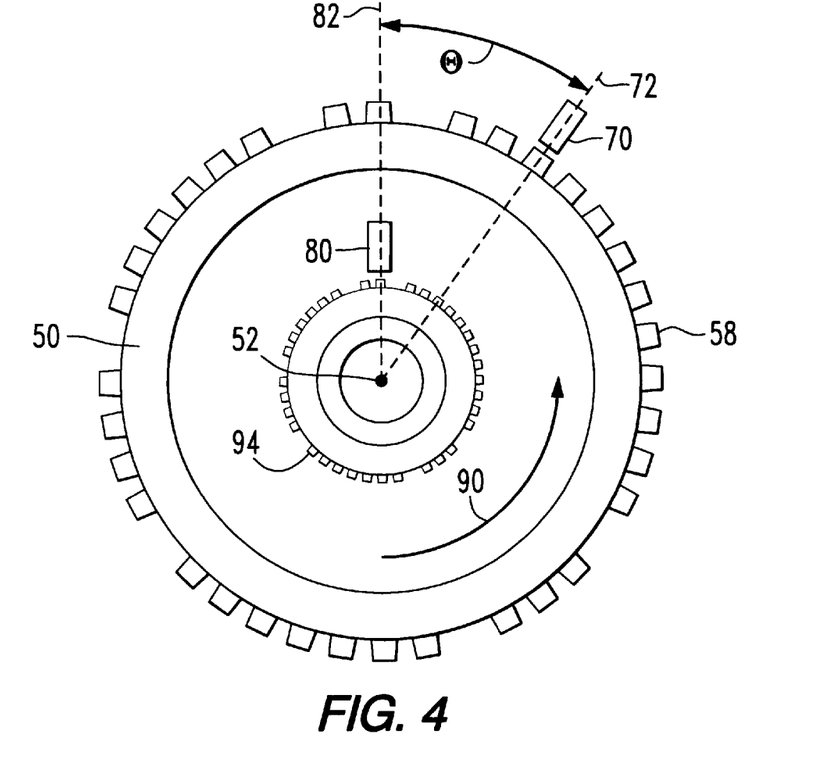
FIG. 4 shows an alternative embodiment with the two sensors of FIG. 4 located at proximate two pluralities of teeth at two different diameters on the first rotatable member.

FIG. 4 is generally similar to FIG. 3, except it represents a slightly modified embodiment of the device shown in FIG. 3. In certain applications, it is inconvenient to mount the moveable sensor 80 at the outer periphery of the first rotatable member 50. Therefore, in addition to the first plurality of teeth 58, a second plurality of teeth 94 is attached to another diameter of the first rotatable member 50. The first and second pluralities of teeth, 58 and 94, are both attached to the first rotatable member 50 and rotate in unison with each other about axis 52. In certain embodiments of the types shown in FIG. 4, the pattern represented by the first plurality of teeth 58 is precisely duplicated by the second plurality of teeth 94. Therefore, the patterns represented by the output signals of the stationary sensor 70 and the movable sensor 80 are generally identical to each other, but with a time offset occurring therebetween as a function of the different spatial relationships between the stationary and movable sensors with the first rotatable member 50. As in the embodiment shown in FIG. 3, line 82 is moveable with respect to line 72 as the movable sensor 80 is rotated about axis 52 to change the magnitude of angle Θ.

The particularly preferred embodiment of the present invention, as will be described below, utilizes the first and second pluralities of gear teeth as shown in FIG. 4. However, it should be clearly understood that the basic operation of the present invention is the same regardless of the precise structure, such as shown in FIGS. 3 and 4, used in conjunction with the sensors and first rotatable member.

Figure 5:
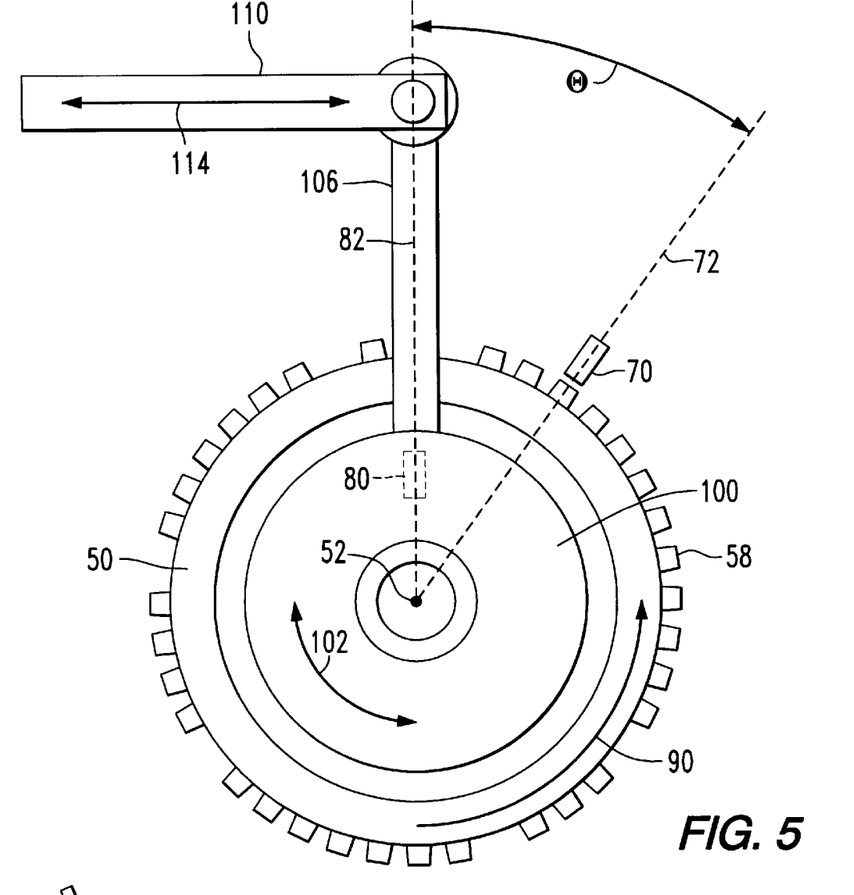
FIG. 5 shows a second rotatable member associated with the first rotatable member of FIG. 4 and arranged to pivot about a common axis.

FIG. 5 is similar to FIG. 4, but with a second rotatable member 100 disposed over the second plurality of teeth 94. The second rotatable member 100 is pivotable about axis 52, as represented by arrow 102. The second rotatable member 100 is pivotable about the axis 52 within a limited angular range. For purposes of reference, the movable sensor 80 is represented by dashed lines in FIG. 5, but it should be understood that the movable sensor is disposed under the second rotatable member 100 and would not normally be visible in the view of FIG. 5. It is shown in dashed lines for the purpose of identifying its approximate location. Although the second plurality of gear teeth 94 are not illustrated in FIG. 5, their relative position near the movable sensor 80 is the same in FIG. 5 as in FIG. 4.

The second rotatable member 100 in FIG. 5 is connected to an arm 106 that can be moved about the central axis to cause the pivoting of the second rotatable member 100. In a typical application, a linkage arm 110 can be attached to a throttle that can be manipulated by an operator of the boat. When the linkage arm 100 moves in the directions indicated by arrow 114, the second rotatable object 100 is rotated about axis 52. As a result, line 82 moves with respect to line 72 and the magnitude of angle Θ is changed. The primary function of the present invention is to accurately determine the magnitude of angle Θ and provide information which allows the engine control unit, or ECU, to accurately determine the position of the throttle. Since the magnitude of angle Θ is directly related to the position of the throttle, because of the physical attachment of the linkage members, the ECU can control the operation of the engine if the magnitude of angle Θ is known.

With continued reference to FIG. 5, it should be understood that the first output signal from the stationary sensor 70 provides a pulse pattern that is representative of the first plurality of gear teeth 58 passing through the detection zone of the stationary sensor. In addition, the second output signal from the movable sensor 80 is a series of pulses that is representative of the second plurality of gear teeth 94 passing through the detection zone of the movable sensor. As will be described in greater detail below, the first and second output signals provided by the stationary and movable sensors allows the engine control unit to accurately determine the magnitude of angle Θ and therefore determine the position of the throttle.

Figure 6:
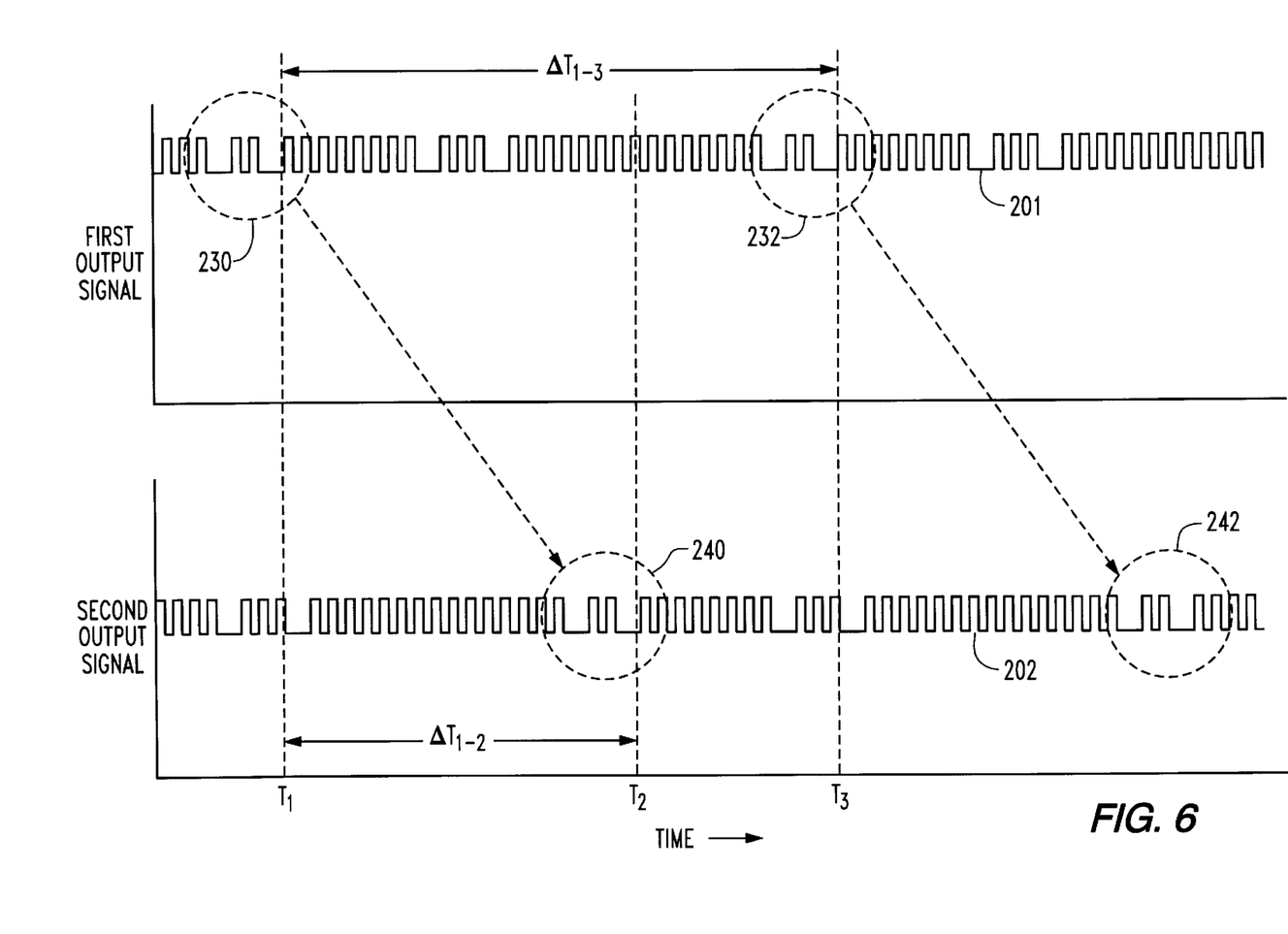
FIG. 6 shows first and second output signals from the stationary and movable sensors, respectively.

FIG. 6 shows graphical representations of the first output signal 201 shown as a series of pulses representing the gear teeth passing through the detection zone of the stationary sensor 70. As represented in FIG. 6, missing teeth are used to create a certain nonuniformity in the signal pattern so that positions on the first rotatable member 50 can be identified. It should be noted that the pattern represented as the first output signal 201 in FIG. 6 is not intended to represent the precise tooth pattern shown on the first plurality of gear teeth 58 in the earlier figures described above. In fact, a comparison between the first output signal 201 and the first plurality of teeth illustrated in FIGS. 3, 4 and 5 will show that these patterns are different. Therefore, it should be further understood that the first output signal 201 in FIG. 6 was provided by a first plurality of teeth having a different pattern than those in the illustrations discussed above. This different pattern results from the selection of the pulse pattern in FIG. 6 for the purpose of simplifying and clarifying the example which will be described below.

With continued reference to FIG. 6, the second output signal 202 represents the pulse pattern provided by the movable sensor 80. The first and second output signals are generally identical to each other, but with a time offset between them. In other words, the pattern identified by reference numeral 230 in the first output signal 201 is defined by two missing teeth with two teeth between the locations from which they are missing. The length of the first output signal 201 in FIG. 6 represents two complete revolutions of the first rotatable member 50. As can be seen, the tooth pattern shown in dashed circle 230 appears again at dashed circle 232 in the series of pulses of the first output signal 201. This same pattern appears twice in the series of pulses of the second output signal 202. They are identified by dashed circles 240 and 242.

With respect to the first output signal 201 in FIG. 6, the rotational speed of the first rotational member 50 can be determined by measuring the time it takes for a particular location within the tooth pattern to reappear. For example, the time between $T_1$ and $T_3$ represents the time of one revolution of the first rotatable member 50. Although the beginning and ending points of this rotation period can be any recognizable location, the one used in the illustration of FIG. 6 is the first rise of a tooth pulse following a first missing tooth, then two teeth, and a then second missing tooth received in sequence. After this sequence is received, the next rise begins a timer in the engine control unit. The timer is allowed to run until the same pattern is seen again. The time difference $\Delta T_{1-3}$ is the rotation time of the first rotatable member 50. This angular velocity can be expressed in degrees or radians per unit of time.

With continued reference to FIG. 6, the second output signal 202 from the movable sensor 80 can be used to measure the time difference, or time offset, between the appearance of a particular location in the pattern in the first signal to its subsequent appearance in the second signal. As an example, the pattern identified within dashed circle 230 in FIG. 6 appears in the series of pulses of the second output signal 202 in dashed circle 240. Using the same precise reference in the pattern (i.e. the rise time after the second missing tooth), time $T_2$ can be determined. By measuring the time difference $\Delta T_{1-2}$ between time $T_1$ and time $T_2$, this time offset can be measured. Since the rotational speed of the first rotatable member 50 is known because of the calculation described immediately above, the angular offset between the movable and stationary sensors can be determined once the time offset $\Delta T_{1-2}$ is measured. Therefore, the use of a stationary and a movable sensor can be used to measure the angle $\Theta$ between lines 72 and 82 as illustrated in FIG. 5.

Figure 7:
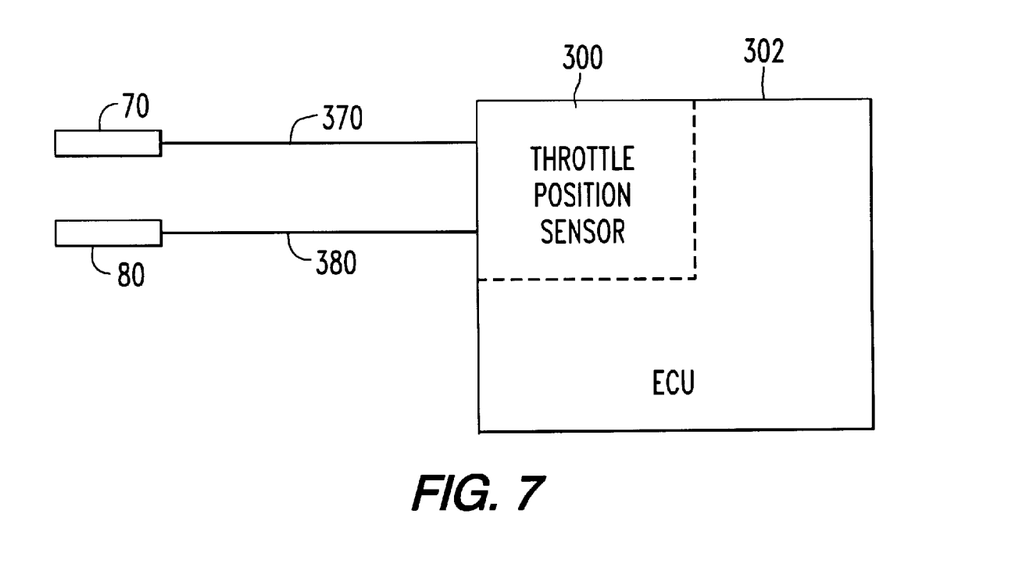
FIG. 7 is a schematic representation of an engine control unit connected in signal communication with the movable and stationary sensors.

In FIG. 7, the stationary sensor 70 is shown connected in signal communication with a throttle position sensor 300 of an engine control unit 302. Line 370 connects the stationary sensor 70 to the throttle position sensor software and line 380 connects the movable sensor 80 to the throttle position sensor software. In other words, the first output signal 201 is transmitted on line 370 and the second output signal 202 is transmitted on line 380. The engine control unit can comprise a microprocessor in which the software is contained for performing the various functions of the present invention.

Figure 8:
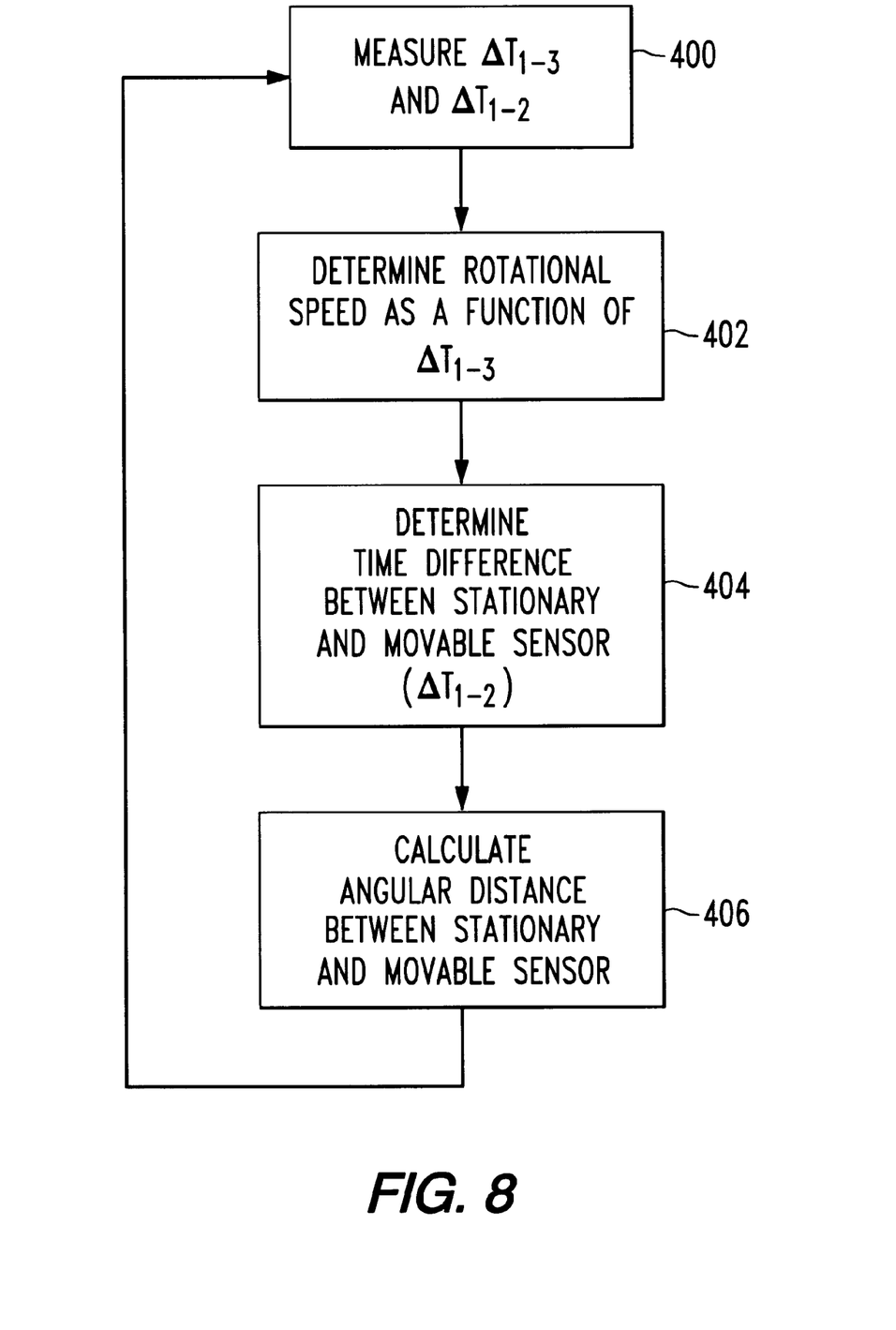
FIG. 8 is a functional block flow chart of the functions performed by software in an engine control unit.

FIG. 8 shows an exemplary flow chart of the calculation procedure performed by the throttle position sensor 300. At functional block 400, the throttle position sensor software 300 measures the two time periods described above in conjunction with FIG. 6. The time period $\Delta T_{1-3}$ is the time that the first rotatable member 50 takes to complete one revolution about its axis. The other time period $\Delta T_{1-2}$ is the time it takes for a preselected location within the tooth pattern to appear in the second output signal 202 after it appears in the first output signal 201. The measurement of functional block 400 can be performed easily by using a rapidly incrementing counter and saving the count value at each of the above described occurrences. Then the stored values are subtracted from each other to determine the period of time that has elapsed between the identified occurrences. In functional block 402, the rotational speed of the first rotatable member 50 is determined as a function of the time that it takes a preselected location in the pattern to reappear after once having appeared. In functional block 404, the time between occurrences of a location in the pattern in the first output signal 201 and the second output signal 202 is measured. Using these two values, the rotational speed of the first rotatable member and the time offset between the two rotatable members, the angular distance between the stationary and movable sensors is calculated in functional block 406. After this calculation is completed and the magnitude of angle $\Theta$ is provided to the engine control unit for its later use, the throttle position sensor software 300 again repeats the process to refresh the magnitudes of the various variables.

Figure 9:
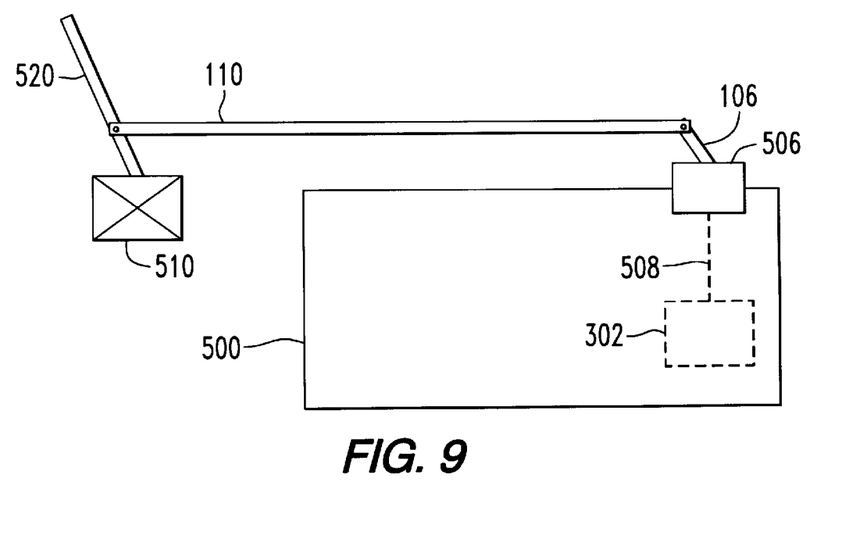
FIG. 9 is a schematic representation of an engine, an engine control unit, a throttle position sensor, and a throttle mechanism in a marine propulsion system.

In FIG. 9, an engine 500 is schematically represented. An engine control unit 302 is shown in dashed line connected to the physical components of the throttle position sensor which are identified by blocks 506. Dashed line 508 identifies the connection between the components 506 of the present invention and the engine control unit 302. Dashed line 508 can comprise lines 370 and 380 of FIG. 7 and any additional connections required. The arm 106 is connected to a linkage member 110, as described above in conjunction with FIG. 5 and the throttle mechanism 510 is connected to the linkage arm 110. Arm 520 is controllable by the operator of a boat.

The advantage of the present invention is that it requires no actual contact between the first movable object 50 and either of the movable or stationary sensors. Vibration of the engine will have negligible impact on the accuracy of the present invention or its expected life. Since gear tooth sensors are easily made water impermeable, the potentially deleterious effects of a water environment will not adversely affect the operation of the angular position sensor made in accordance with the present invention. In addition, since many marine engines require at least one gear tooth sensor to determine the angular position of the first rotatable member 50, which is typically a flywheel, the use of the stationary sensor 70 does not require an additional component. Therefore, by simply adding the movable sensor 80, along with the appropriate software in the engine control unit, an angular position sensor can be developed which solves many of the problems associated with throttle position sensing.

Although the present invention has been described in considerable detail and illustrated with particular specificity, it should be understood that alternative embodiments are also within its scope.

I claim:

1. A rotational position sensor, comprising:
   a first rotatable member having a pattern attached thereto, said first rotatable member being rotatable about an axis;
   a stationary sensor disposed proximate said first rotatable member, said stationary sensor providing a first output signal representative of said pattern as said pattern moves past said stationary sensor in response to rotation of said first rotatable member;
   a second rotatable member being rotatable within an angular range about said axis, said second rotatable member being rotatable with respect to said first rotatable member;
   a movable sensor attached to said second rotatable member and disposed proximate said first rotatable member, said movable sensor providing a second output signal representative of said pattern as said pattern moves past said movable sensor in response to rotation of said first rotatable member; and
   an electronic circuit for receiving said first and second signals and determining an angle between said stationary and movable sensors.

2. The sensor of claim 1, wherein:

said pattern comprises a first plurality of teeth proximate said stationary sensor and a second plurality of teeth proximate said movable sensor, said first and second pluralities of teeth being attached to said first rotatable member.

3. The sensor of claim 2, wherein:

said first and second pluralities of teeth are each arranged in said pattern.

4. The sensor of claim 3, wherein:

said first and second pluralities of teeth are attached to different diameters of said first rotatable member.

5. The sensor of claim 1, wherein:

said electronic circuit is a microprocessor.

6. The sensor of claim 1, wherein:

said electronic circuit calculates a rotational speed of said first rotatable member as a function of said first output signal and said electronic circuit calculates a time offset between said first and second output signals; and said electronic circuit calculates said angle between said stationary and movable sensors as a function of said rotational speed and said time offset.

7. The sensor of claim 1, wherein:

said second rotatable member is connected to a throttle mechanism of an internal combustion engine.

8. The sensor of claim 7, wherein:

said internal combustion engine is a portion of a marine propulsion unit.

9. The sensor of claim 1, wherein:

said stationary sensor is a first geartooth sensor.

10. The sensor of claim 9, wherein:

said movable sensor is a second geartooth sensor.

11. A rotational position sensor, comprising:

a first rotatable member having a pattern attached thereto, said first rotatable member being rotatable about an axis;

a stationary sensor disposed proximate said first rotatable member, said stationary sensor providing a first output signal representative of said pattern as said pattern moves past said stationary sensor in response to rotation of said first rotatable member;

a second rotatable member being rotatable within an angular range about said axis, said second rotatable member being rotatable with respect to said first rotatable member;

a movable sensor attached to said second rotatable member and disposed proximate said first rotatable member, said movable sensor providing a second output signal representative of said pattern as said pattern moves past said movable sensor in response to rotation of said first rotatable member; and an electronic circuit for receiving said first and second signals and determining an angle between said stationary and movable sensors, said electronic circuit being a microprocessor.

12. The sensor of claim 11, wherein:

said pattern comprises a first plurality of teeth proximate said stationary sensor and a second plurality of teeth proximate said movable sensor, said first and second pluralities of teeth being attached to said first rotatable member.

13. The sensor of claim 12, wherein:

said first and second pluralities of teeth are each arranged in said pattern.

14. The sensor of claim 13, wherein:

said first and second pluralities of teeth are attached to different diameters of said first rotatable member.

15. The sensor of claim 11, wherein:

said electronic circuit calculates a rotational speed of said first rotatable member as a function of said first output signal and said electronic circuit calculates a time offset between said first and second output signals; and said electronic circuit calculates said angle between said stationary and movable sensors as a function of said rotational speed and said time offset.

16. The sensor of claim 11, wherein:

said second rotatable member is connected to a throttle mechanism of an internal combustion engine.

17. The sensor of claim 16, wherein:

said internal combustion engine is a portion of a marine propulsion unit.

18. The sensor of claim 11, wherein:

said stationary sensor is a first geartooth sensor.

19. The sensor of claim 17, wherein:

said movable sensor is a second geartooth sensor.

20. A rotational position sensor, comprising:

a first rotatable member having a pattern attached thereto, said first rotatable member being rotatable about an axis;

a stationary sensor disposed proximate said first rotatable member, said stationary sensor providing a first output signal representative of said pattern as said pattern moves past said stationary sensor in response to rotation of said first rotatable member;

a second rotatable member being rotatable within an angular range about said axis, said second rotatable member being rotatable with respect to said first rotatable member;

a movable sensor attached to said second rotatable member and disposed proximate said first rotatable member, said movable sensor providing a second output signal representative of said pattern as said pattern moves past said movable sensor in response to rotation of said first rotatable member; and an electronic circuit for receiving said first and second signals and determining an angle between said stationary and movable sensors, said pattern comprising a first plurality of teeth proximate said stationary sensor and a second plurality of teeth proximate said movable sensor, said first and second pluralities of teeth being attached to said first rotatable member, said first and second pluralities of teeth being each arranged in said pattern, said first and second pluralities of teeth being attached to different diameters of said first rotatable member, said electronic circuit calculating a rotational speed of said first rotatable member as a function of said first output signal and a time offset between said first and second output signals, said electronic circuit calculating said angle between said stationary and movable sensors as a function of said rotational speed and said time offset, said second rotatable member being connected to a throttle mechanism of an internal combustion engine, said stationary sensor being a first geartooth sensor, said movable sensor being a second geartooth sensor.

* * * * *